(12) United States Patent
Du et al.

(10) Patent No.: US 11,765,629 B2
(45) Date of Patent: Sep. 19, 2023

(54) CONNECTION SETUP METHOD, USER EQUIPMENT, COMMON CENTRAL CONTROL NODE AND COMMUNICATION SYSTEM

(71) Applicant: NOKIA SOLUTIONS AND NETWORKS SYSTEM TECHNOLOGY (BEIJING) CO., LTD., Beijing (CN)

(72) Inventors: Lei Du, Beijing (CN); Yang Liu, Beijing (CN); Ingo Viering, Munich (DE); Paolo Zanier, Munich (DE)

(73) Assignee: NOKIA SOLUTIONS AND NETWORKS SYSTEM TECHNOLOGY (BEIJING) CO., LTD, Beijing (CN)

( * ) Notice: Subject to any disclaimer, the term of this patent is extended or adjusted under 35 U.S.C. 154(b) by 216 days.

(21) Appl. No.: 17/157,174

(22) Filed: Jan. 25, 2021

(65) Prior Publication Data
US 2021/0144597 A1 May 13, 2021

Related U.S. Application Data

(63) Continuation of application No. 16/474,360, filed as application No. PCT/CN2016/112372 on Dec. 27, 2016, now abandoned.

(51) Int. Cl.
*H04W 36/00* (2009.01)
*H04W 76/15* (2018.01)
(Continued)

(52) U.S. Cl.
CPC . *H04W 36/0061* (2013.01); *H04W 36/00835* (2018.08); *H04W 48/16* (2013.01); *H04W 76/15* (2018.02); *H04B 7/024* (2013.01)

(58) Field of Classification Search
None
See application file for complete search history.

(56) References Cited

U.S. PATENT DOCUMENTS

2001/0036823 A1* 11/2001 Van Lieshout ....... H04W 36/10
455/418
2003/0220109 A1* 11/2003 Jami .................... H04W 48/20
455/437
(Continued)

FOREIGN PATENT DOCUMENTS

CN 102457922 A 5/2012
CN 103096456 A 5/2013
(Continued)

OTHER PUBLICATIONS

Chinese Office Action issued in corresponding Chinese Patent Application No. 201680092088.1 dated Oct. 9, 2022.
(Continued)

*Primary Examiner* — Christopher T Wyllie
(74) *Attorney, Agent, or Firm* — SQUIRE PATTON BOGGS (US) LLP

(57) ABSTRACT

The present invention provides a connection setup method, the corresponding user equipment, common central control node and communication system. A connection setup method performed by a user device, comprising: acquiring information transmitted by a plurality of cells; determining a plurality of candidate cells according to the information transmitted by the plurality of cells, sending a common connection setup request for the plurality of candidate cells to a common central control node, the common central control node corresponding to each of the plurality of candidate cells; receiving a common connection setup message for a plurality of connecting cells transmitted by the common central control node, the plurality of connecting cells being determined from the plurality of candidate cells (Continued)

by the common central control node, so that the user equipment establishes multiple radio connections through each of the plurality of connecting cells.

7 Claims, 4 Drawing Sheets

(51) Int. Cl.
*H04W 48/16* (2009.01)
*H04B 7/024* (2017.01)

(56) References Cited

U.S. PATENT DOCUMENTS

| | | | | |
|---|---|---|---|---|
| 2005/0090255 | A1* | 4/2005 | Kuchibhotla | H04W 48/18 455/435.2 |
| 2007/0258402 | A1* | 11/2007 | Nakamata | H04W 72/563 370/329 |
| 2009/0069019 | A1* | 3/2009 | Hayama | H04W 48/20 455/445 |
| 2009/0219906 | A1* | 9/2009 | Motegi | H04J 13/00 370/342 |
| 2009/0247163 | A1* | 10/2009 | Aoyama | H04W 48/10 455/436 |
| 2010/0210258 | A1* | 8/2010 | Nylander | H04W 16/10 455/422.1 |
| 2011/0038280 | A1* | 2/2011 | Jung | H04L 5/001 370/254 |
| 2012/0034881 | A1* | 2/2012 | Warken | H04W 8/26 455/68 |
| 2012/0063297 | A1* | 3/2012 | Hong | H04W 48/16 370/216 |
| 2013/0182563 | A1* | 7/2013 | Johansson | H04W 76/19 370/216 |
| 2013/0223272 | A1 | 8/2013 | Tao et al. | |
| 2014/0011502 | A1* | 1/2014 | Moilanen | H04W 36/245 455/437 |
| 2014/0295828 | A1* | 10/2014 | Pogosova | H04W 48/18 455/553.1 |
| 2015/0264615 | A1 | 9/2015 | Zhao et al. | |
| 2015/0282239 | A1* | 10/2015 | Han | H04W 36/04 370/329 |
| 2015/0295728 | A1* | 10/2015 | Kadel | H04L 12/2874 370/235 |
| 2016/0054778 | A1* | 2/2016 | Shin | G06F 1/3206 713/323 |
| 2016/0262179 | A1* | 9/2016 | Choi | H04W 74/00 |
| 2017/0272975 | A1* | 9/2017 | Uchino | H04L 1/188 |
| 2017/0295591 | A1* | 10/2017 | Nguyen | H04W 28/08 |
| 2017/0311233 | A1* | 10/2017 | Du | H04W 48/10 |
| 2018/0077612 | A1* | 3/2018 | Zheng | H04W 76/11 |
| 2018/0115931 | A1 | 4/2018 | Lee et al. | |
| 2019/0132790 | A1* | 5/2019 | Lee | H04W 48/18 |
| 2019/0230497 | A1* | 7/2019 | Ljung | H04W 8/22 |
| 2021/0120458 | A1* | 4/2021 | Koskela | H04W 36/0061 |

FOREIGN PATENT DOCUMENTS

| | | |
|---|---|---|
| CN | 103119873 A | 5/2013 |
| CN | 103329583 A | 9/2013 |
| CN | 104365126 A | 2/2015 |
| WO | 2016/144879 A1 | 9/2019 |

OTHER PUBLICATIONS

Cisco Systems, "Xw-Flow Control Aspects", 3GPP TSG-RAN WG3#90, Anaheim, USA, Nov. 16-20, 2015, R3-152701, 3 pages.
Motorola, "V0.0.1 of 3GPP's RRC Protocol Specification (S2.31)", 3GPP S2.31 V0.0.1 Jan. 1999, RRC Protocol Specification, 3GPP RAN WG2, Mar. 8-11, 1999, Stockholm, Sweden, Tdoc 059/99, R2-99059, 54 pages.
Broadband Forum, Straw Ballot, dsl2006.400, TSG SA Meeting #53, Fukuoka, Japan, Sep. 19-21, 2011, SP-110450, WT-134 Broadband Policy Control Framework (PCF), Revision: 32, Revision Date: Jun. 2011, 158 pages.
International Search Report and Written Opinion dated Aug. 30, 2017 corresponding to International Patent Application No. PCT/CN2016/112372. No copy provided, per MPEP 609. Copy submitted in parent U.S. Appl. No. 16/474,360.

* cited by examiner

CONNECTION SETUP METHOD, USER EQUIPMENT, COMMON CENTRAL CONTROL NODE AND COMMUNICATION SYSTEM

CROSS REFERENCE TO RELATED APPLICATION

This is a Continuation of U.S. patent application Ser. No. 16/474,360 filed on Jun. 27, 2019 which is a 371 application of International Patent Application No. PCT/CN2016/112372 filed Dec. 27, 2016. The contents of these applications are hereby incorporated by reference.

FIELD

The present invention relates to the technical field of communication, and particular to a connection setup method performed by user equipment, common central control node and communication system, and the corresponding user equipment, common central control node and communication system.

BACKGROUND

The internal study on 5G small cell targets to provide a disruptive approach to meet the requirements expected in 2020, e.g. supporting ×1000 more traffic, less than 1 ms end to end latency, flat energy consumption etc. From mobility point of view, handover latency is considered as the most critical challenge and is highest prioritized in the system design. Optimally, zero handover latency i.e., interruption time, is pursued to hide the cell change totally from the UE which optimizes the UE perception of the service continuity.

The mobility study starts from the investigation on the single connectivity, i.e. the UE keeps connectivity with single cell at one moment. It is observed that it is difficult to achieve zero handover latency for both UL and DL because of packet forwarding, system information reading, random access etc. Multiple connectivity is considered as a potentially efficient way to minimize the handover interruption by keeping connectivity to multiple cells simultaneously.

Some technologies have been defined in standardization e.g. CA, dual connectivity, soft handover, CoMP etc. Wherein, in Carrier Aggregation (CA), two or more cells operating on different (or same) carriers are aggregated in order to support wider transmission bandwidths up to 100 MHz. A UE may simultaneously receive or transmit on one or multiple cells depending on its capabilities. When CA is configured, the UE only has one RRC connection with the network.

In Dual Connectivity (DC), UE is allowed to transmit and receive on macro cell and small cells simultaneously. Just as carrier aggregation, the Dual Connectivity feature in LTE requires the connected cells to be on different carriers, i.e. it builds on top of carrier aggregation.

Soft handover is defined in WCDMA FDD systems to provide the UE with the multiple radio links operating on the same carrier during mobility procedure. The network configures the active set depending on the UE measurement reporting results, and UE is then receiving and transmitting data simultaneously from/to the multiple cells to improve the service continuity.

For DL CoMP, multiple transmission points are coordinated in their downlink data transmission. In case of joint transmission, a UE is receiving data simultaneously from multiple intra-BS cells operating on the same carrier frequency. The UE may be configured via RRC reconfiguration message to measure and report the CSI of a set of non-zero power CSI-RS resources. However, the UE has only one RRC connection and one serving cell. Although CoMP allows the data to be transmitted over multiple cells at the same time, it must be under the assumption that the serving cell is good enough. In case the serving cell needs to be changed, the CoMP would be stopped and UE performs normal single-connectivity handover procedure to change the serving cell.

Multipoint transmission has been defined in HSPA+ to improve data rate for cell-edge users by transmission from two cells. However, there is only one primary cell at one cell, while other cells, named assisting cell or secondary cell, do not support the full functionality. Similarly to the carrier aggregation, the change of primary cell is done via multi-flow configuration triggered by certain event which brings signalling overhead as well.

There are other cases where UE is supporting multiple RATs and working simultaneously on the multiple links in independent way. This is already common on multi-mode terminals, e.g. 3G+LTE, WLAN+LTE, FDD+TDD. But the UE need set up connections to each network separately. The connections are really independent and there is neither coordination nor centralized controller between the two RATs. Even some UE assistance information is specified e.g. in LTE-WiFi interworking in 3GPP, it just intends to provide some simple WiFi information e.g. frequency/channels to have UE in LTE aware of the WiFi status. The operations in the two networks are still independent. It is not possible to control the UE behaviour in one network via the communications with another network.

Despites of the different names, the common feature is that a UE is allowed to keep connectivity with multiple cells at the same time. However, nearly all the mentioned prior art are techniques to realize the multi-connectivity, after the first RRC connection setup, which means that only after UE setup a first connection with network side, following additional links or connections could be added into the multi-connectivity session. This will create delay for introduction of multi-connectivity from the beginning, as well as more signaling overhead.

Therefore, the present disclosure provides a method and system which reduces signaling overhead during the establishment of multi-connectivity.

SUMMARY

In view of this, the present invention provides a connection setup method performed by user equipment, common central control node and communication system, and the corresponding user equipment, common central control node and communication system saved signaling overhead and improved the transmission reliability.

According to an aspect of the present invention, the present invention provides a connection setup method performed by a user device, comprising: acquiring information transmitted by a plurality of cells; determining a plurality of candidate cells according to the information transmitted by the plurality of cells, sending a common connection setup request for the plurality of candidate cells to a common central control node, the common central control node corresponding to each of the plurality of candidate cells; receiving a common connection setup message for a plurality of connecting cells transmitted by the common central control node, the plurality of connecting cells being determined from the plurality of candidate cells by the common central control node, so that the user equipment establishes multiple radio connections through each of the plurality of connecting cells.

According to another aspect of the present invention, the present invention provides connection setup method performed by a common central control node, comprising: receiving a common connection setup request for a plurality of candidate cells transmitted by the user equipment, the common central control node corresponding to each of the plurality of candidate cells; determining a plurality of connecting cells from the plurality of candidate cells, transmitting a common connection setup message for the plurality of connecting cells to the user equipment, so that the user equipment establishes multiple radio connections through each of the plurality of connecting cells.

According to another aspect of the present invention, the present invention provides a connection setup method in a communication system, the method comprising: a user equipment in the communication system acquires information transmitted by a plurality of cells in the communication system; the user equipment determines a plurality of candidate cells according to the information transmitted by the plurality of cells and sends a common connection setup request for the plurality of candidate cells to a common central control node in the communication system, the common central control node corresponding to each of the plurality of candidate cells; the common central control node determines a plurality of connecting cells from the plurality of candidate cells, and transmits a common connection setup message for the plurality of connecting cells to the user equipment, so that the user equipment establishes multiple radio connections through each of the plurality of connecting cells.

According to another aspect of the present invention, the present invention provides a user equipment, comprising: a cell acquisition unit configured to acquire information transmitted by a plurality of cells; a connection request sending unit configured to determine a plurality of candidate cells according to information transmitted by the plurality of cells and send a common connection setup request for the plurality of candidate cells to a common central control node, the common central control node corresponding to each of the plurality of candidate cells; a connection message receiving unit configured to receive a common connection setup message for a plurality of connecting cells transmitted by the common central control node, the plurality of connecting cells being determined from the plurality of candidate cells by the common central control node, so that the user equipment establishes multiple radio connections through each of the plurality of connecting cells.

According to another aspect of the present invention, the present invention provides a common central control node, comprising: a connection request receiving unit configured to receive a common connection setup request for a plurality of candidate cells transmitted by the user equipment, the common central control node corresponding to each of the plurality of candidate cells; a connection message sending unit configured to determine a plurality of connecting cells from the plurality of candidate cells, to transmit a common connection setup message to the plurality of connecting cells to the user equipment, so that the user equipment establishes multiple radio connections through each of the plurality of connection cells.

According to another aspect of the present invention, the present invention provides a communication system, comprising: a user equipment configured to acquire information transmitted by a plurality of cells in the communication system; determine a plurality of candidate cells according to the information transmitted by the plurality of cells and send a common connection setup request for the plurality of candidate cells to a common central control node in the communication system, the common central control node corresponding to each of the plurality of candidate cells; a common central control node configured to determine a plurality of connecting cells from the plurality of candidate cells, and transmit a common connection setup message for the plurality of connecting cells to the user equipment, so that the user equipment establishes multiple radio connections through each of the plurality of connecting cells.

In summary, based on connection setup method performed by user equipment, common central control node and communication system, the present invention can set up multiple connections at the cost of single connection setup procedure, which saves signaling overhead to the network. (i.e. multi-connection setup in radio interface will converge into one S1-MME interface management process), and the multi-connectivity could be started from the beginning of UE access, which save time compared with legacy schemes. Further, the message of the common central control node could be sent on any of the connections, which allows using the best connections hence improving the transmission reliability and efficiency.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

Further scope of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

Figure 1:
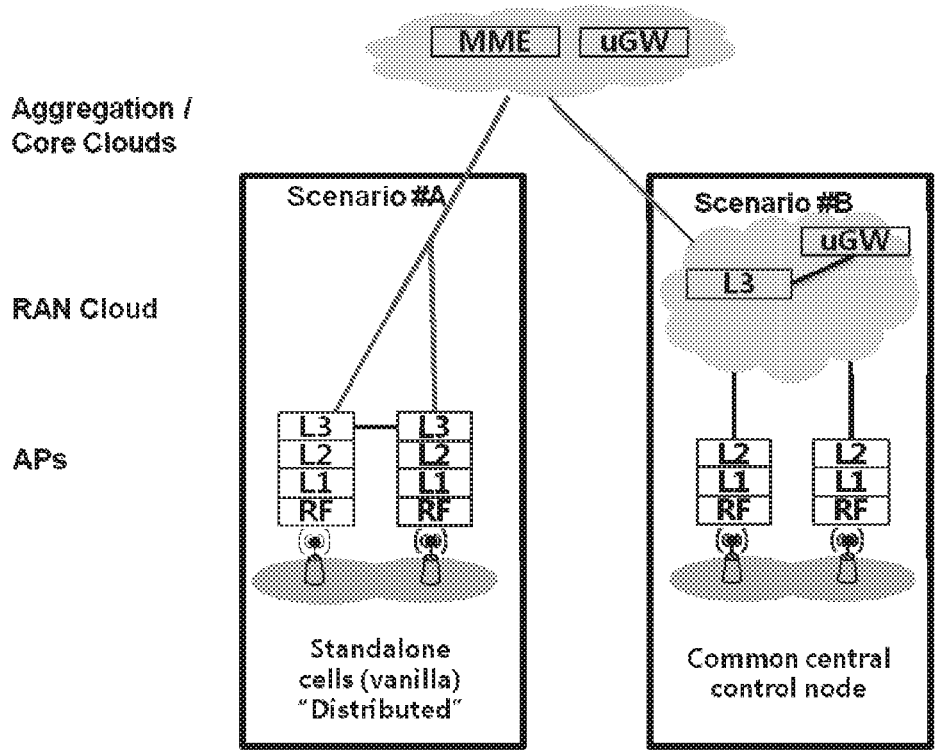
FIG. 1 illustrates the main scenarios of 5G small cells.

Depending on the deployment scenarios of 5G small cells, the mobility procedure is investigated in the three main scenarios considering the respective characteristics. The main scenarios of 5G small cells are shown in FIG. 1, wherein, the left rectangle of FIG. 1 shows the standalone scenario #A where each cell has the full control of all the functionalities from L1 to L3 and is connecting to other cells via ideal or non-ideal backhaul. Specifically, L1 is called Physics Layer, L2 is called Data Link Layer, and L3 is called Network Layer. This is the basic mobility scenario on which the mainstream technologies in 3GPP is based e.g. CA, dual connectivity etc. The right rectangle of FIG. 1 shows a scenario #B separates the functionalities between cloud and cells. All the cells share a common L3 located in the cloud, while still have independent control over lower layers i.e. L1/L2. This invention focuses on the scenarios where the cells share a common L3, which also called a common central control node, and a UE is moving between the different cells. The common central control node has the function of Network Layer (L3) and part of function of Data Link Layer (L2) such as MAC.

It is proposed that UE sets up a common connection with multiple cells, which equalizes to multiple connections, in one RRC connection setup procedure and considers the connection alive as long as one of the connections is alive.

Specifically, the present invention proposes the following embodiments.

According to an aspect of the present invention, a connection setup method performed by a user device is provided, and illustrative embodiments of the connection setup method will be described in reference to FIG. 2.

Figure 2:
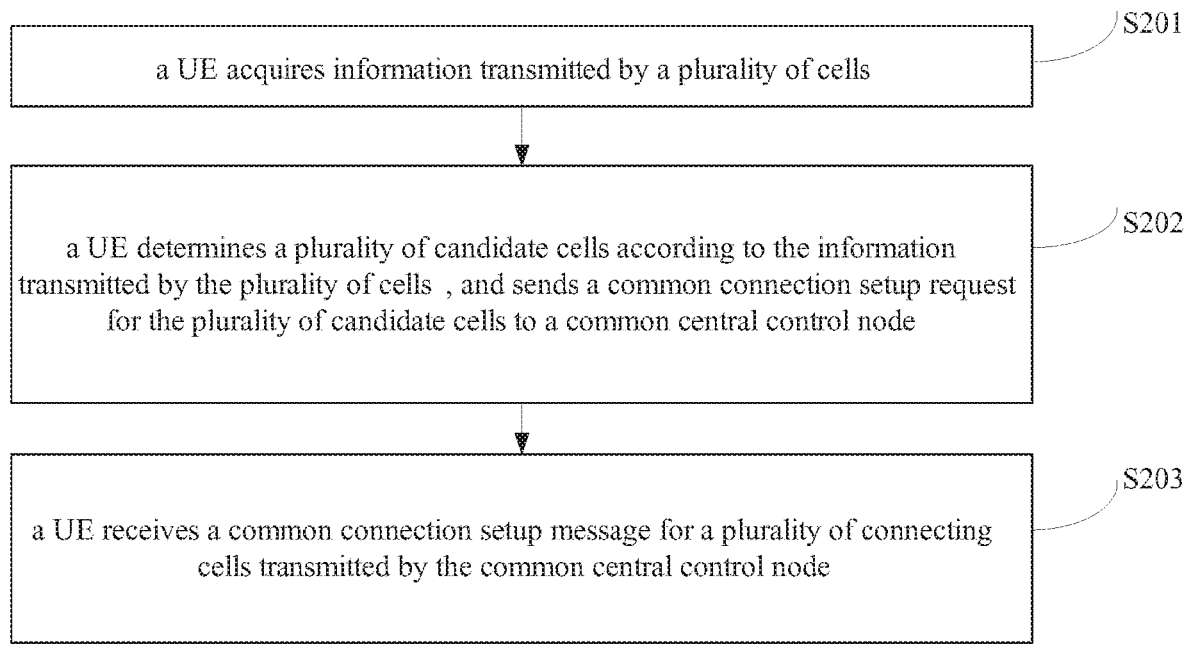
FIG. 2 illustrates a flowchart of a connection setup method performed by a user equipment according to an embodiment of the invention.
Figure 3:
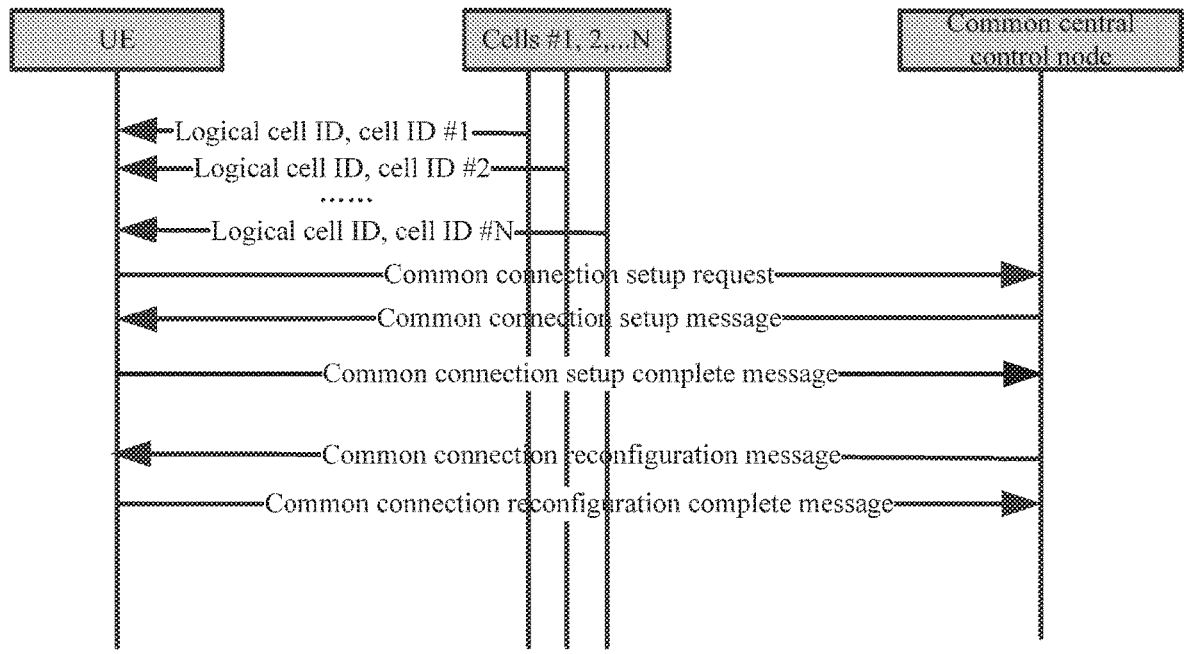
FIG. 3 illustrates a schematic diagram of a connection setup method.

FIG. 2 illustrates a flowchart of a connection setup method 200 performed by a user device according to an embodiment of the invention, and FIG. 3 illustrates a schematic diagram of a connection setup method described in reference to FIG. 2. In the scenario of the embodiment of the present invention, it is assumed that all the cells have a shared common central control node which is identified by a logical cell ID. Meanwhile, each cell has a separate cell ID e.g. depending on the reference signal it is using.

As shown in FIG. 2, in step S201, a UE acquires information transmitted by a plurality of cells. Wherein, when the UE is in idle mode, it camps to one cell via a single RRC procedure, i.e. RRC connection setup procedure, and monitors the system information from both the camped cell and the neighbour cells. The information transmitted by a plurality of cells may includes a cell ID and a logical cell ID of each cell of the plurality of cells, and it may further includes the channel measurement results of each cell of the plurality of cells.

In step S202, UE determines a plurality of candidate cells according to the information transmitted by the plurality of cells, and sends a common connection setup request for the plurality of candidate cells to a common central control node, the common central control node corresponding to each of the plurality of candidate cells.

As described above, all the cells have a shared common central control node is identified by a logical cell ID. Therefore, UE can determine a common central control node based on the logical cell ID of each cells, and select a set of cells which have the same logical cell ID (which share the same common central control node) as the plurality of candidate cells. The selected plurality of candidate cells could be all cells which have the same logical cell ID; or part of cells which have the same logical cell ID. When the plurality of candidate cells are part of cells which have the same logical cell ID, these candidate cells may be selected based on the measurement for neighbour cells, e.g. selecting all the suitable cells with highest RSRP/RSRQ.

When there is data to send, the UE sends the common connection setup request message to the common central control node. The common connection setup request message may comprise: "default" setting which means the common connection is going to applied to all the cells having the same logical cell ID, or a "preferred cell list" of the selected plurality of candidate cells which means the common connection is applied to the selected plurality of candidate cells.

In step S203, UE receives a common connection setup message for a plurality of connecting cells transmitted by the common central control node, the plurality of connecting cells are determined from the plurality of candidate cells by the common central control node. Therefore, the user equipment finishes establishing multiple radio connections through each of the plurality of connecting cells, to the core network node.

In this step, the common central control node sends a common connection setup message after receiving the common connection setup request sent from UE. Upon receiving the common connection setup request message, the common central control node decides which connecting cells the connection could apply and includes it into the common connection setup message. The common central control node can make the filtering from the candidate cells requested by UE and inform UE about the final decision which cells could be used in the end. The decision of the plurality of connecting cells can consider the candidate cells and the cell status, e.g. load status.

According to an embodiment of the invention, UE can confirm the common connection with all the connecting cells by sending a common connection setup complete message to the common central control node.

According to an embodiment of the invention, the method can further comprise: receiving a common connection configuration message transmitted by the common central control node, wherein the common connection configuration message is sent by the common central control node through any of the plurality of connecting cells, and sending a common connection configuration complete message to the common central control node, and in the meanwhile applies the common connection configuration to any one or more of the plurality of connecting cells.

The common central control node can send the common connection configuration messages in order to configure related parameters i.e. common configurations, to the UE. And UE applies the common configuration and confirms via a common connection configuration complete message. The transmission of common connection configuration messages e.g. RRC (e.g. RRC connection reconfiguration procedure), NAS (uplink or downlink PDU transmission procedure), could be via any of the possible connections between UE and the connecting cells, and can be applied to all the other of the connections. The selection for message transmitting can be determined based on the channel measurement, etc. Afterwards, the common central control node informs all the connecting cells to which UE can setup the multi-connection to apply the common configuration for the UE and be ready to serve the LE. Up to now, a common connection has been setup with multiple connecting cells and these connecting cells have the common configuration from the common central control node.

Furthermore, during the reconfiguration process, the method can also further comprise: receiving a common connection reconfiguration message transmitted by the common central control node, wherein the common connection reconfiguration message is sent by the common central control node through any of the plurality of connecting cells, and sending a common connection reconfiguration complete message to the common central control node, and in the meanwhile applies the common connection reconfiguration to any one or more of the plurality of connecting cells.

Optionally, UE may determine whether it does not complete configuration for some of the plurality of connecting cells; and when the UE does not complete the configuration for some of the plurality of connecting cells, it can remove the connecting cells that have not been completely configured from the plurality of connecting cells and indicate an updated connecting cell list in reconfiguration complete message.

According to an embodiment of the invention, UE can send a measurement report for any of the plurality of connecting cells through this connecting cell or any other connecting cells of the plurality of connecting cells, to the common central control node. It is possible to add new connecting cells or remove some connecting cells according to the measurement results. Given the common connection with multiple cells, the handover procedure is done by adding and/or removing a cell. As long as more than two cells are in the common connection, the UE has more than one link to the system therefore the reliability is improved and the handover interruption could be eliminated.

The process above can be done in following alternative ways. In Alternative 1, the UE sends the measurement reports to the common central control node via any of the connecting cells in the cell list. Upon receiving the reports, the common central control node evaluates the measurement results and decides whether to add and/or remove a cell e.g. depending on the RSRP, RSRQ etc., and then informs the UE to add and/or remove a cell. And the common central control node notifies the corresponding cells to apply the common configuration to the added cell, and release the common configuration to the removed cell. In this procedure, as the common central control node does not have to include the configuration information to each added cell, the signalling of adding/removing a cell could be very simple by only including the cell ID, thus the signalling overhead is greatly decreased. In Alternative 2, the UE can ask for adding/removing a cell depending on the measurement results to save the measurement reports to the common central control node. When the common central control node decides to accept the request, it can send the acknowledgement and then informs the corresponding cells to apply the configuration. In Alternative 3, the adding/removing a cell can be triggered by a pre-defined condition known to both UE and common central control node. For instance, the common central control node can configure two events and related parameters to trigger the measurement report respectively. If the measurement report is triggered by the first event e.g. current RSRP/RSRQ higher than a threshold, both UE and the common central control node decided to add a cell. And if the measurement result is triggered by the second event, e.g. current RSRP/RSRQ lower than a threshold, both UE and the common central control node decided to remove a cell. Then the common central control node informs corresponding cells to apply the configuration. This alternative could further decrease the signalling overhead due to adding/removing a cell.

According to an embodiment of the invention, when the UE detects radio link failure in a connecting cell, e.g. by receiving the out-of-sync from lower layers for several times. The UE would send notification informing the radio link failure to the common central control node via other connecting cells. When receiving the notification, the common central control node sets this connecting cell to pending state and prohibits the cell from transmitting/receiving data for a certain time period e.g. a timer. The UE would inform the recovery of the link if the link is recovered before the timer expires, then the common central control node recover the state of this connecting cell and informs this connecting cell continuing serving the UE. Otherwise, if the UE does not receive any link recovery notification until timer expires, the common central control node assumes this link fails eventually and informs removing this connecting cell.

According to an embodiment of the invention, when the UE do not have one link to the common central control node, the common connection in this invention may handover to the legacy procedure. Radio link monitoring is on all the connections, and this handover procedure is not triggered as long as there is at least one connection available.

According to an embodiment of the invention, when the common central control node decides to release the common connection, the common central control node will send a connection release message via any of the current connecting cells and the UE then disconnects with all the connecting cells.

In summary, based on connection setup method performed by user equipment, the present invention can set up multiple connections at the cost of single connection setup procedure, which saves signalling overhead to the network, (i.e. multi-connection setup in radio interface will converge into one S1-MME interface management process), and the multi-connectivity could be started from the beginning of UE access, which save time compared with legacy schemes. Further, the message of the common central control node could be sent on any of the connections, which allows using the best connections hence improving the transmission reliability and efficiency.

According to an aspect of the present invention, a connection setup method performed by a common central control node is provided, and illustrative embodiments of the connection setup method will be described in reference to FIG. 4.

Figure 4:
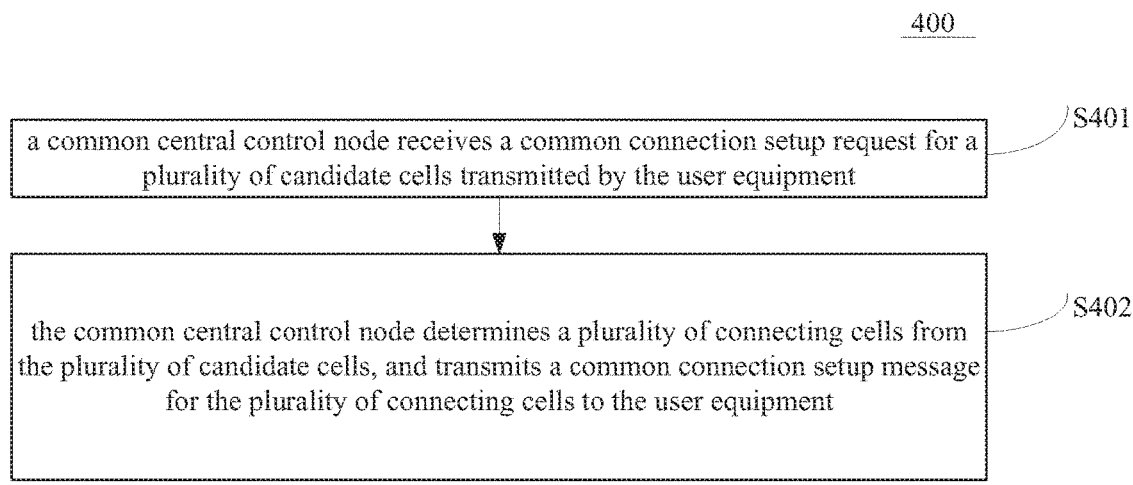
FIG. 4 illustrates a flowchart of a connection setup method performed by a common central control node according to an embodiment of the invention.

FIG. 4 illustrates a flowchart of a connection setup method 400 performed by a common central control node according to an embodiment of the invention, and FIG. 3 also illustrates a schematic diagram of a connection setup method described in reference to FIG. 4. In the scenario of the embodiment of the present invention, it is assumed that all the cells have a shared common central control node which is identified by a logical cell ID. Meanwhile, each cell has a separate cell ID e.g. depending on the reference signal it is using.

As shown in FIG. 4, in step S401, a common central control node receives a common connection setup request for a plurality of candidate cells transmitted by the user equipment, the common central control node corresponding to each of the plurality of candidate cells.

Wherein, when the UE is in idle mode, it camps to one cell via a single RRC procedure, i.e. RRC connection setup procedure, and monitors the system information from both the camped cell and the neighbour cells. The information transmitted by a plurality of cells may includes a cell ID and a logical cell ID of each cell of the plurality of cells, and it may further includes the channel measurement results of each cell of the plurality of cells.

As described above, all the cells have a shared common central control node is identified by a logical cell ID. Therefore, UE can determine a common central control node based on the logical cell ID of each cells, and select a set of cells which have the same logical cell ID (which share the same common central control node) as the plurality of candidate cells. The selected plurality of candidate cells could be all cells which have the same logical cell ID; or part of cells which have the same logical cell ID. When the plurality of candidate cells are part of cells which have the same logical cell ID, these candidate cells may be selected based on the measurement for neighbour cells, e.g. selecting all the suitable cells with highest RSRP/RSRQ.

When there is data to send, the UE sends the common connection setup request message to the common central control node. The common connection setup request message may comprise: "default" setting which means the common connection is going to applied to all the cells having the same logical cell ID, or a "preferred cell list" of the selected plurality of candidate cells which means the common connection is applied to the selected plurality of candidate cells.

In step S402, the common central control node determines a plurality of connecting cells from the plurality of candidate cells, and transmits a common connection setup message for the plurality of connecting cells to the user equipment. Therefore, the user equipment finishes establishing multiple radio connections through each of the plurality of connecting cells, to the core network node.

In this step, the common central control node sends a common connection setup message after receiving the common connection setup request sent from UE. Upon receiving the common connection setup request message, the common central control node decides which connecting cells the connection could apply and includes it into the common connection setup message. The common central control node can make the filtering from the candidate cells requested by UE and inform UE about the final decision which cells could be used in the end. The decision of the plurality of connecting cells can consider the candidate cells and the cell status, e.g. load status.

According to an embodiment of the invention, UE can confirm the common connection with all the connecting cells by sending a common connection setup complete message to the common central control node.

According to an embodiment of the invention, the method can further comprise: sending a common connection configuration message to the user equipment through any of the plurality of connecting cells; and receiving a common connection configuration complete message.

The common central control node can send the common connection configuration messages in order to configure related parameters i.e. common configurations, to the UE. And UE applies the common configuration and confirms via a common connection configuration complete message. The transmission of common connection configuration messages e.g. RRC (e.g. RRC connection reconfiguration procedure), NAS (uplink or downlink PDU transmission procedure), could be via any of the possible connections between UE and the connecting cells, and can be applied to all the other of the connections. The selection for message transmitting can be determined based on the channel measurement, etc. Afterwards, the common central control node informs all the connecting cells to which UE can setup the multi-connection to apply the common configuration for the UE and be ready to serve the UE. Up to now, a common connection has been setup with multiple connecting cells and these connecting cells have the common configuration from the common central control node.

Furthermore, during the reconfiguration process, the method can also further comprise: sending a common connection reconfiguration message to the user equipment through any of the plurality of connecting cells; and receiving a common connection reconfiguration complete message.

Optionally, UE may determine whether it does not complete configuration for some of the plurality of connecting cells; and when the UE does not complete the configuration for some of the plurality of connecting cells, it can remove the connecting cells that have not been completely configured from the plurality of connecting cells and indicate an updated connecting cell list in reconfiguration complete message.

According to an embodiment of the invention, the common central control node can receive a measurement report for any of the plurality of connecting cells sent through this connecting cell or any other connecting cells of the plurality of connecting cells by the user equipment. It is possible to add new connecting cells or remove some connecting cells according to the measurement results. Given the common connection with multiple cells, the handover procedure is done by adding and/or removing a cell. As long as more than two cells are in the common connection, the UE has more than one link to the system therefore the reliability is improved and the handover interruption could be eliminated.

The process above can be done in following alternative ways. In Alternative 1, the UE sends the measurement reports to the common central control node via any of the connecting cells in the cell list. Upon receiving the reports, the common central control node evaluates the measurement results and decides whether to add and/or remove a cell e.g. depending on the RSRP, RSRQ etc., and then informs the UE to add and/or remove a cell. And the common central control node notifies the corresponding cells to apply the common configuration to the added cell, and release the common configuration to the removed cell. In this procedure, as the common central control node does not have to include the configuration information to each added cell, the signalling of adding/removing a cell could be very simple by only including the cell ID, thus the signalling overhead is greatly decreased. In Alternative 2, the LTE can ask for adding/removing a cell depending on the measurement results to save the measurement reports to the common central control node. When the common central control node decides to accept the request, it can send the acknowledgement and then informs the corresponding cells to apply the configuration. In Alternative 3, the adding/removing a cell can be triggered by a pre-defined condition known to both UE and common central control node. For instance, the common central control node can configure two events and related parameters to trigger the measurement report respectively. If the measurement report is triggered by the first event e.g. current RSRP/RSRQ higher than a threshold, both UE and the common central control node decided to add a cell. And if the measurement result is triggered by the second event, e.g. current RSRP/RSRQ lower than a threshold, both UE and the common central control node decided to remove a cell. Then the common central control node informs corresponding cells to apply the configuration. This alternative could further decrease the signalling overhead due to adding/removing a cell.

According to an embodiment of the invention, when the UE detects radio link failure in a connecting cell, e.g. by receiving the out-of-sync from lower layers for several times. The UE would send notification informing the radio link failure to the common central control node via other connecting cells. When receiving the notification, the common central control node sets this connecting cell to pending state and prohibits the cell from transmitting/receiving data for a certain time period e.g. a timer. The UE would inform the recovery of the link if the link is recovered before the timer expires, then the common central control node recover the state of this connecting cell and informs this connecting cell continuing serving the UE. Otherwise, if the UE does not receive any link recovery notification until timer expires, the common central control node assumes this link fails eventually and informs removing this connecting cell.

According to an embodiment of the invention, when the UE do not have one link to the common central control node, the common connection in this invention may handover to the legacy procedure. Radio link monitoring is on all the connections, and this handover procedure is not triggered as long as there is at least one connection available.

According to an embodiment of the invention, when the common central control node decides to release the common connection, the common central control node will send a connection release message via any of the current connecting cells and the UE then disconnects with all the connecting cells.

In summary, based on connection setup method performed by common central control node, the present invention can set up multiple connections at the cost of single connection setup procedure, which saves signalling overhead to the network. (i.e. multi-connection setup in radio interface will converge into one S1-MME interface management process), and the multi-connectivity could be started from the beginning of UE access, which save time compared with legacy schemes. Further, the message of the common central control node could be sent on any of the connections, which allows using the best connections hence improving the transmission reliability and efficiency.

According to an aspect of the present invention, a connection setup method in a communication system is provided, and illustrative embodiments of the connection setup method will be described in reference to FIG. 5.

Figure 5:
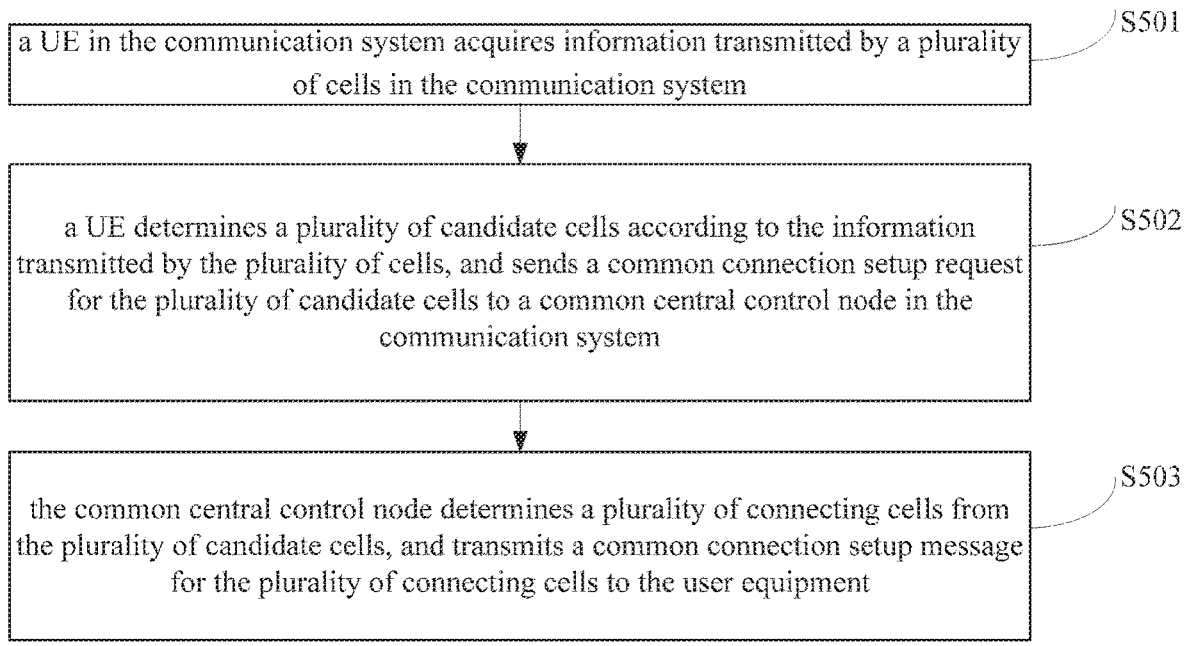
FIG. 5 illustrates a flowchart of a connection setup method in a communication system according to an embodiment of the invention.

FIG. 5 illustrates a flowchart of a connection setup method in a communication system according to an embodiment of the invention, and FIG. 3 also illustrates a schematic diagram of a connection setup method in a communication system described in reference to FIG. 5. In the scenario of the embodiment of the present invention, it is assumed that all the cells have a shared common central control node which is identified by a logical cell ID. Meanwhile, each cell has a separate cell ID e.g. depending on the reference signal it is using.

As shown in FIG. 5, in step S501, a UE in the communication system acquires information transmitted by a plurality of cells in the communication system. Wherein, when the UE is in idle mode, it camps to one cell via a single RRC procedure, i.e. RRC connection setup procedure, and monitors the system information from both the camped cell and the neighbour cells. The information transmitted by a plurality of cells may includes a cell ID and a logical cell ID of each cell of the plurality of cells, and it may further includes the channel measurement results of each cell of the plurality of cells.

In step S502, UE determines a plurality of candidate cells according to the information transmitted by the plurality of cells, and sends a common connection setup request for the plurality of candidate cells to a common central control node in the communication system, the common central control node corresponding to each of the plurality of candidate cells.

As described above, all the cells have a shared common central control node is identified by a logical cell ID. Therefore, UE can determine a common central control node based on the logical cell ID of each cells, and select a set of cells which have the same logical cell ID (which share the same common central control node) as the plurality of candidate cells. The selected plurality of candidate cells could be all cells which have the same logical cell ID; or part of cells which have the same logical cell ID. When the plurality of candidate cells are part of cells which have the same logical cell ID, these candidate cells may be selected based on the measurement for neighbour cells, e.g. selecting all the suitable cells with highest RSRP/RSRQ.

When there is data to send, the UE sends the common connection setup request message to the common central control node. The common connection setup request message may comprise: "default" setting which means the common connection is going to applied to all the cells having the same logical cell ID, or a "preferred cell list" of the selected plurality of candidate cells which means the common connection is applied to the selected plurality of candidate cells.

In step S103, the common central control node determines a plurality of connecting cells from the plurality of candidate cells, and transmits a common connection setup message for the plurality of connecting cells to the user equipment, so that the user equipment establishes multiple radio connections through each of the plurality of connecting cells.

In this step, the common central control node sends a common connection setup message after receiving the common connection setup request sent from UE. Upon receiving the common connection setup request message, the common central control node decides which connecting cells the connection could apply and includes it into the common connection setup message. The common central control node can make the filtering from the candidate cells requested by UE and inform UE about the final decision which cells could be used in the end. The decision of the plurality of connecting cells can consider the candidate cells and the cell status, e.g. load status.

According to an embodiment of the invention, UE can confirm the common connection with all the connecting cells by sending a common connection setup complete message to the common central control node.

According to an embodiment of the invention, the method can further comprise: UE receives a common connection configuration message transmitted by the common central control node, wherein the common connection configuration message is sent by the common central control node through any of the plurality of connecting cells, and UE sends a common connection configuration complete message to the common central control node, and in the meanwhile applies the common connection configuration to any one or more of the plurality of connecting cells.

The common central control node can send the common connection configuration messages in order to configure related parameters i.e. common configurations, to the UE. And UE applies the common configuration and confirms via a common connection configuration complete message. The transmission of common connection configuration messages e.g. RRC (e.g. RRC connection reconfiguration procedure), NAS (uplink or downlink PDU transmission procedure), could be via any of the possible connections between UE and the connecting cells, and can be applied to all the other of the connections. The selection for message transmitting can be determined based on the channel measurement, etc. Afterwards, the common central control node informs all the connecting cells to which UE can setup the multi-connection to apply the common configuration for the UE and be ready to serve the UE. Up to now, a common connection has been setup with multiple connecting cells and these connecting cells have the common configuration from the common central control node.

Furthermore, during the reconfiguration process, the method can also further comprise: UE receives a common connection reconfiguration message transmitted by the common central control node, wherein the common connection reconfiguration message is sent by the common central control node through any of the plurality of connecting cells, and UE sends a common connection reconfiguration complete message to the common central control node, and in the meanwhile applies the common connection reconfiguration to any one or more of the plurality of connecting cells.

Optionally, UE may determine whether it does not complete configuration for some of the plurality of connecting cells; and when the UE does not complete the configuration for some of the plurality of connecting cells, it can remove the connecting cells that have not been completely configured from the plurality of connecting cells and indicate an updated connecting cell list in reconfiguration complete message.

According to an embodiment of the invention, UE can send a measurement report for any of the plurality of connecting cells through this connecting cell or any other connecting cells of the plurality of connecting cells, to the common central control node. It is possible to add new connecting cells or remove some connecting cells according to the measurement results. Given the common connection with multiple cells, the handover procedure is done by adding and/or removing a cell. As long as more than two cells are in the common connection, the UE has more than one link to the system therefore the reliability is improved and the handover interruption could be eliminated.

According to an embodiment of the invention, when the UE detects radio link failure in a connecting cell, e.g. by receiving the out-of-sync from lower layers for several times. The UE would send notification informing the radio link failure to the common central control node via other connecting cells. When receiving the notification, the common central control node sets this connecting cell to pending state and prohibits the cell from transmitting/receiving data for a certain time period e.g. a timer. The UE would inform the recovery of the link if the link is recovered before the timer expires, then the common central control node recover the state of this connecting cell and informs this connecting cell continuing serving the UE. Otherwise, if the UE does not receive any link recovery notification until timer expires, the common central control node assumes this link fails eventually and informs removing this connecting cell.

According to an embodiment of the invention, when the UE do not have one link to the common central control node, the common connection in this invention may handover to the legacy procedure. Radio link monitoring is on all the connections, and this handover procedure is not triggered as long as there is at least one connection available.

According to an embodiment of the invention, when the common central control node decides to release the common connection, the common central control node will send a connection release message via any of the current connecting cells and the UE then disconnects with all the connecting cells.

In summary, based on connection setup method performed in communication system, the present invention can set up multiple connections at the cost of single connection setup procedure, which saves signalling overhead to the network. (i.e. multi-connection setup in radio interface will converge into one S1-MME interface management process), and the multi-connectivity could be started from the beginning of UE access, which save time compared with legacy schemes. Further, the message of the common central control node could be sent on any of the connections, which allows using the best connections hence improving the transmission reliability and efficiency.

According to an aspect of the present invention, an example of a connection setup method in a communication system is provided. Specifically, when the LTE is in idle mode, it camps to one cell (e.g., cell #1) via a single RRC procedure, and monitors the system information from both the camped cell #1 and the neighbour cell #2, 3, . . . 8. The information transmitted by the cells includes cell ID and logical cell ID of each cell. In this example, cell #1, 2, 4, 5, 8 have the same logical cell ID CD, and cell #3, 6, 7 have another logical cell ID @.

Then UE can determine a set of cells (e.g. cell #1, 2, 4, 5) which have the same logical cell ID CD and highest RSRP/RSRQ as the candidate cells and send the common connection setup request message to the common central control node CD of cell #1, 2, 4, 5.

Upon receiving the connection request message, the common central control node CD decides the connecting cells (#1, 2, 5) the connection could apply and includes it to the common connection setup message according to the candidate cells and the cell load status.

After that, UE confirm the common connection with connecting cells #1, 2, 5 by sending a common connection setup complete message to the common central control node CD.

Wherein, over DL, a RRC common connection configuration messages sent from the common central control node CD can be sent to cell #1, but the common configuration could be applied to cell #2, cell #5 or applied to cell #1, 2 and 5. Over UL, a measurement report of Cell #1 can also be sent over cell #2 or cell #5 to the common central control node CD.

According to another aspect of the present invention, a user equipment is provided, and illustrative block diagram of a user equipment 600 according to an embodiment of the invention will be described in reference to FIG. 6.

Figure 6:
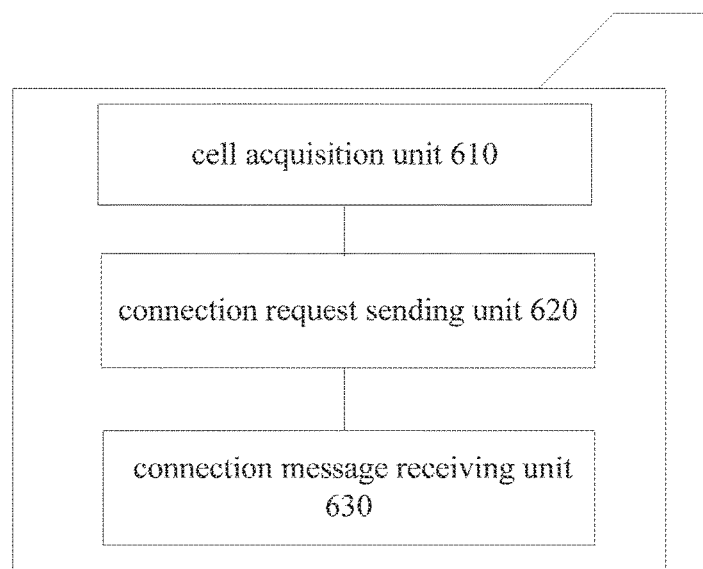
FIG. 6 illustrates a schematic block diagram of a user equipment according to an embodiment of the invention.

As shown in FIG. 6, the user equipment comprises: a cell acquisition unit 610, a connection request sending unit 620 and a connection message receiving unit 630. In addition to these three units, the user equipment 600 may also include other components, however, since these components are not related to the contents of the embodiments of the present invention, the illustration and description thereof are omitted here. In addition, since the specific details of the following operations performed by the user equipment 600 according to the embodiment of the present invention are the same as those described above with reference to FIGS. 2-3, repetitive descriptions of the same details are omitted here to avoid duplication.

In the scenario of the embodiment of the present invention, it is assumed that all the cells have a shared common central control node which is identified by a logical cell ID. Meanwhile, each cell has a separate cell ID e.g. depending on the reference signal it is using.

The cell acquisition unit 610 acquires information transmitted by a plurality of cells. Wherein, when the is in idle mode, it camps to one cell via a single RRC procedure, i.e. RRC connection setup procedure, and monitors the system information from both the camped cell and the neighbour cells. The information transmitted by a plurality of cells may includes a cell ID and a logical cell ID of each cell of the plurality of cells, and it may further includes the channel measurement results of each cell of the plurality of cells.

The connection request sending unit 620 determines a plurality of candidate cells according to the information transmitted by the plurality of cells, and sends a common connection setup request for the plurality of candidate cells to a common central control node, the common central control node corresponding to each of the plurality of candidate cells.

As described above, all the cells have a shared common central control node is identified by a logical cell ID. Therefore, the connection request sending unit 620 can determine a common central control node based on the logical cell ID of each cells, and select a set of cells which have the same logical cell ID (which share the same common central control node) as the plurality of candidate cells. The selected plurality of candidate cells could be all cells which have the same logical cell ID; or part of cells which have the same logical cell ID. When the plurality of candidate cells are part of cells which have the same logical cell ID, these candidate cells may be selected based on the measurement for neighbour cells, e.g. selecting all the suitable cells with highest RSRP/RSRQ.

When there is data to send, the connection request sending unit 620 sends the common connection setup request message to the common central control node. The common connection setup request message may comprise: "default" setting which means the common connection is going to applied to all the cells having the same logical cell ID, or a "preferred cell list" of the selected plurality of candidate cells which means the common connection is applied to the selected plurality of candidate cells.

The connection message receiving unit 630 receives a common connection setup message for a plurality of connecting cells transmitted by the common central control node, the plurality of connecting cells are determined from the plurality of candidate cells by the common central control node. Therefore, the user equipment 600 finishes establishing multiple radio connections through each of the plurality of connecting cells, to the core network node.

Specifically, the common central control node sends a common connection setup message after receiving the common connection setup request sent from the connection request sending unit 620. Upon receiving the common connection setup request message, the common central control node decides which connecting cells the connection could apply and includes it into the common connection setup message. The common central control node can make the filtering from the candidate cells requested by the connection request sending unit 620 of UE and inform UE about the final decision which cells could be used in the end. The decision of the plurality of connecting cells can consider the candidate cells and the cell status, e.g. load status.

According to an embodiment of the invention, UE 600 can further comprise: a connection complete message (not shown in FIG. 6), which configured to confirm the common connection with all the connecting cells by sending a common connection setup complete message to the common central control node.

According to an embodiment of the invention, UE 600 can further comprise: a configuration message receiving unit (not shown in FIG. 6) configured to receive a common connection configuration message transmitted by the common central control node, wherein the common connection configuration message is sent by the common central control node through any of the plurality of connecting cells; and a configuration complete message sending unit (not shown in FIG. 6) configured to send a common connection configuration complete message to the common central control node, and in the meanwhile applies the common connection configuration to any one or more of the plurality of connecting cells.

The common central control node can send the common connection configuration messages in order to configure related parameters i.e. common configurations, to the configuration message receiving unit of UE. And the configuration complete message sending unit of UE applies the common configuration and confirms via a common connection configuration complete message. The transmission of common connection configuration messages e.g. RRC (e.g. RRC connection reconfiguration procedure), NAS (uplink or downlink PDU transmission procedure), could be via any of the possible connections between UE and the connecting cells, and can be applied to all the other of the connections. The selection for message transmitting can be determined based on the channel measurement, etc. Afterwards, the common central control node informs all the connecting cells to which UE can setup the multi-connection to apply the common configuration for the UE and be ready to serve the UE. Up to now, a common connection has been setup with multiple connecting cells and these connecting cells have the common configuration from the common central control node.

Furthermore, during the reconfiguration process, the configuration message receiving unit can also be configured to receive a common connection reconfiguration message transmitted by the common central control node, wherein the common connection reconfiguration message is sent by the common central control node through any of the plurality of connecting cells; and the configuration complete message sending unit can be configured to send a common connection reconfiguration complete message to the common central control node, and in the meanwhile applies the common connection reconfiguration to any one or more of the plurality of connecting cells.

Optionally, the configuration complete message sending unit of UE may determine whether it does not complete configuration for some of the plurality of connecting cells; and when the configuration complete message sending unit does not complete the configuration for some of the plurality of connecting cells, it can remove the connecting cells that have not been completely configured from the plurality of connecting cells and indicate an updated connecting cell list in reconfiguration complete message.

According to an embodiment of the invention, the connection message receiving unit 630 of UE can further configured to send a measurement report for any of the plurality of connecting cells through this connecting cell or any other connecting cells of the plurality of connecting cells, to the common central control node. It is possible to add new connecting cells or remove some connecting cells according to the measurement results. Given the common connection with multiple cells, the handover procedure is done by adding and/or removing a cell. As long as more than two cells are in the common connection, the UE has more than one link to the system therefore the reliability is improved and the handover interruption could be eliminated.

According to an embodiment of the invention, when the UE detects radio link failure in a connecting cell, e.g. by receiving the out-of-sync from lower layers for several times. The UE would send notification informing the radio link failure to the common central control node via other connecting cells. When receiving the notification, the common central control node sets this connecting cell to pending state and prohibits the cell from transmitting/receiving data for a certain time period e.g. a timer. The UE would inform the recovery of the link if the link is recovered before the timer expires, then the common central control node recover the state of this connecting cell and informs this connecting cell continuing serving the UE. Otherwise, if the UE does not receive any link recovery notification until timer expires, the common central control node assumes this link fails eventually and informs removing this connecting cell.

According to an embodiment of the invention, when the UE do not have one link to the common central control node, the common connection in this invention may handover to the legacy procedure. Radio link monitoring is on all the connections, and this handover procedure is not triggered as long as there is at least one connection available.

According to an embodiment of the invention, when the common central control node decides to release the common connection, the common central control node will send a connection release message via any of the current connecting cells and the UE then disconnects with all the connecting cells.

In summary, based on the user equipment of the present invention, the multiple connections can be set up at the cost of single connection setup procedure, which saves signalling overhead to the network. (i.e. multi-connection setup in radio interface will converge into one S1-MME interface management process), and the multi-connectivity could be started from the beginning of UE access, which save time compared with legacy schemes. Further, the message of the common central control node could be sent on any of the connections, which allows using the best connections hence improving the transmission reliability and efficiency.

According to another aspect of the present invention, a common central control node is provided, and illustrative block diagram of a common central control node 700 according to an embodiment of the invention will be described in reference to FIG. 7.

Figure 7:
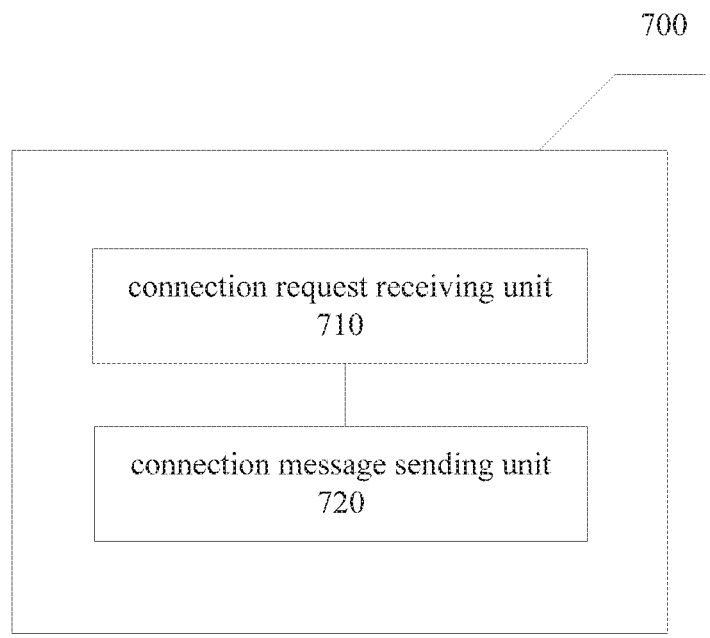
FIG. 7 illustrates a schematic block diagram of a common central control node according to an embodiment of the invention.

As shown in FIG. 7, the common central control node 700 comprises: a connection request receiving unit 710 and a connection message sending unit 720. In addition to these two units, the common central control node 700 may also include other components, however, since these components are not related to the contents of the embodiments of the present invention, the illustration and description thereof are omitted here. In addition, since the specific details of the following operations performed by the common central control node 700 according to the embodiment of the present invention are the same as those described above with reference to FIG. 4, repetitive descriptions of the same details are omitted here to avoid duplication.

In the scenario of the embodiment of the present invention, it is assumed that all the cells have a shared common central control node which is identified by a logical cell ID. Meanwhile, each cell has a separate cell ID e.g. depending on the reference signal it is using.

As shown in FIG. 7, the connection request receiving unit 710 receives a common connection setup request for a plurality of candidate cells transmitted by the user equipment, the common central control node corresponding to each of the plurality of candidate cells.

Wherein, when the UE is in idle mode, it camps to one cell via a single RRC procedure, i.e. RRC connection setup procedure, and monitors the system information from both the camped cell and the neighbour cells. The information transmitted by a plurality of cells may includes a cell ID and a logical cell ID of each cell of the plurality of cells, and it may further includes the channel measurement results of each cell of the plurality of cells.

As described above, all the cells have a shared common central control node is identified by a logical cell ID. Therefore, UE can determine a common central control node based on the logical cell ID of each cells, and select a set of cells which have the same logical cell ID (which share the same common central control node) as the plurality of candidate cells. The selected plurality of candidate cells could be all cells which have the same logical cell ID; or part of cells which have the same logical cell ID. When the plurality of candidate cells are part of cells which have the same logical cell ID, these candidate cells may be selected based on the measurement for neighbour cells, e.g. selecting all the suitable cells with highest RSRP/RSRQ.

When there is data to send, the UE sends the common connection setup request message to the connection request receiving unit 710. The common connection setup request message may comprise: "default" setting which means the common connection is going to applied to all the cells having the same logical cell ID, or a "preferred cell list" of the selected plurality of candidate cells which means the common connection is applied to the selected plurality of candidate cells.

The connection message sending unit 720 determines a plurality of connecting cells from the plurality of candidate cells, and transmits a common connection setup message for the plurality of connecting cells to the user equipment. Therefore, the user equipment finishes establishing multiple radio connections through each of the plurality of connecting cells, to the core network node.

Specifically, the connection message sending unit 720 sends a common connection setup message after receiving the common connection setup request sent from UE. Upon receiving the common connection setup request message, the connection message sending unit 720 decides which connecting cells the connection could apply and includes it into the common connection setup message. The connection message sending unit 720 can make the filtering from the candidate cells requested by UE and inform UE about the final decision which cells could be used in the end. The decision of the plurality of connecting cells can consider the candidate cells and the cell status, e.g. load status.

According to an embodiment of the invention, UE can confirm the common connection with all the connecting cells by sending a common connection setup complete message to a connection complete message receiving unit (not shown in FIG. 7) of the common central control node.

According to an embodiment of the invention, the common central control node can further comprise: a configuration message sending unit (not shown in FIG. 7) configured to send a common connection configuration message to the user equipment through any of the plurality of connecting cells; and a configuration complete message receiving unit (not shown in FIG. 7) configured to receive a common connection configuration complete message.

The configuration message sending unit of the common central control node can send the common connection configuration messages in order to configure related parameters i.e. common configurations, to the UE. And UE applies the common configuration and confirms via a common connection configuration complete message. The transmission of common connection configuration messages e.g. RRC (e.g. RRC connection reconfiguration procedure), NAS (uplink or downlink PDU transmission procedure), could be via any of the possible connections between UE and the connecting cells, and can be applied to all the other of the connections. The selection for message transmitting can be determined based on the channel measurement, etc. Afterwards, the configuration complete message receiving unit of the common central control node informs all the connecting cells to which UE can setup the multi-connection to apply the common configuration for the UE and be ready to serve the UE. Up to now, a common connection has been setup with multiple connecting cells and these connecting cells have the common configuration from the common central control node.

Furthermore, during the reconfiguration process, the configuration message sending unit can further be configured to send a common connection reconfiguration message to the user equipment through any of the plurality of connecting cells; and the configuration complete message receiving unit can further be configured to receive a common connection reconfiguration complete message.

Optionally, UE may determine whether it does not complete configuration for some of the plurality of connecting cells; and when the UE does not complete the configuration for some of the plurality of connecting cells, it can remove the connecting cells that have not been completely configured from the plurality of connecting cells and indicate an updated connecting cell list in reconfiguration complete message.

According to an embodiment of the invention, the common central control node can receive a measurement report for any of the plurality of connecting cells sent through this connecting cell or any other connecting cells of the plurality of connecting cells by the user equipment. It is possible to add new connecting cells or remove some connecting cells according to the measurement results. Given the common connection with multiple cells, the handover procedure is done by adding and/or removing a cell. As long as more than two cells are in the common connection, the UE has more than one link to the system therefore the reliability is improved and the handover interruption could be eliminated.

The process above can be done in following alternative ways. In Alternative 1, the UE sends the measurement reports to the common central control node via any of the connecting cells in the cell list. Upon receiving the reports, the common central control node evaluates the measurement results and decides whether to add and/or remove a cell e.g. depending on the RSRP, RSRQ etc., and then informs the UE to add and/or remove a cell. And the common central control node notifies the corresponding cells to apply the common configuration to the added cell, and release the common configuration to the removed cell. In this procedure, as the common central control node does not have to include the configuration information to each added cell, the signalling of adding/removing a cell could be very simple by only including the cell ID, thus the signalling overhead is greatly decreased. In Alternative 2, the UE can ask for adding/removing a cell depending on the measurement results to save the measurement reports to the common central control node. When the common central control node decides to accept the request, it can send the acknowledgement and then informs the corresponding cells to apply the configuration. In Alternative 3, the adding/removing a cell can be triggered by a pre-defined condition known to both UE and common central control node. For instance, the common central control node can configure two events and related parameters to trigger the measurement report respectively. If the measurement report is triggered by the first event e.g. current RSRP/RSRQ higher than a threshold, both UE and the common central control node decided to add a cell. And if the measurement result is triggered by the second event, e.g. current RSRP/RSRQ lower than a threshold, both UE and the common central control node decided to remove a cell. Then the common central control node informs corresponding cells to apply the configuration. This alternative could further decrease the signalling overhead due to adding/removing a cell.

According to an embodiment of the invention, when the UE detects radio link failure in a connecting cell, e.g. by receiving the out-of-sync from lower layers for several times. The UE would send notification informing the radio link failure to the common central control node via other connecting cells. When receiving the notification, the common central control node sets this connecting cell to pending state and prohibits the cell from transmitting/receiving data for a certain time period e.g. a timer. The UE would inform the recovery of the link if the link is recovered before the timer expires, then the common central control node recover the state of this connecting cell and informs this connecting cell continuing serving the UE. Otherwise, if the UE does not receive any link recovery notification until timer expires, the common central control node assumes this link fails eventually and informs removing this connecting cell.

According to an embodiment of the invention, when the UE do not have one link to the common central control node, the common connection in this invention may handover to the legacy procedure. Radio link monitoring is on all the connections, and this handover procedure is not triggered as long as there is at least one connection available.

According to an embodiment of the invention, when the common central control node decides to release the common connection, the common central control node will send a connection release message via any of the current connecting cells and the UE then disconnects with all the connecting cells.

In summary, based on the common central control node of the present invention, multiple connections can be set up at the cost of single connection setup procedure, which saves signalling overhead to the network. (i.e. multi-connection setup in radio interface will converge into one S1-MME interface management process), and the multi-connectivity could be started from the beginning of UE access, which save time compared with legacy schemes. Further, the message of the common central control node could be sent on any of the connections, which allows using the best connections hence improving the transmission reliability and efficiency.

According to another aspect of the present invention, a communication system is provided, and illustrative block diagram of a communication system 800 according to an embodiment of the invention will be described in reference to FIG. 8.

Figure 8:
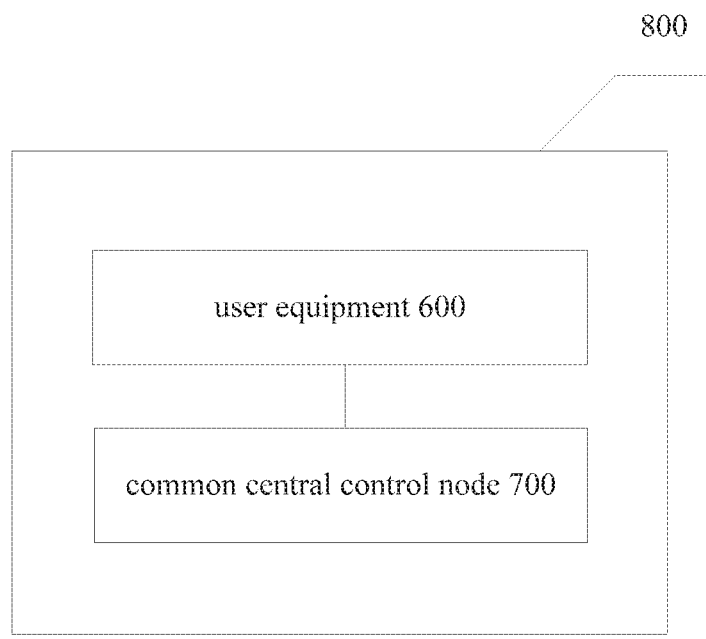
FIG. 8 illustrates a schematic block diagram of a communication system according to an embodiment of the invention.

As shown in FIG. 8, the communication system 800 comprises: a user equipment 600 and a common central control node 700. In addition to these two units, the communication system 800 may also include other components, however, since these components are not related to the contents of the embodiments of the present invention, the illustration and description thereof are omitted here. In addition, since the specific details of the following operations performed by the communication system 800 according to the embodiment of the present invention are the same as those described above with reference to FIGS. 5-7, repetitive descriptions of the same details are omitted here to avoid duplication.

The UE 600 maybe, for example, any kind of wireless device such as a mobile phone, a cellular phone, a Personal Digital Assistant (PDA), a smart phone, a tablet, a laptop computer, a handheld device having wireless connection capability, or other devices etc.

In the scenario of the embodiment of the present invention, it is assumed that all the cells have a shared common central control node which is identified by a logical cell ID. Meanwhile, each cell has a separate cell ID e.g. depending on the reference signal it is using.

As shown in FIG. 8, a UE 600 in the communication system acquires information transmitted by a plurality of cells in the communication system. Wherein, when the UE is in idle mode, it camps to one cell via a single RRC procedure, i.e. RRC connection setup procedure, and monitors the system information from both the camped cell and the neighbour cells. The information transmitted by a plurality of cells may includes a cell ID and a logical cell ID of each cell of the plurality of cells, and it may further includes the channel measurement results of each cell of the plurality of cells.

UE 600 further determines a plurality of candidate cells according to the information transmitted by the plurality of cells, and sends a common connection setup request for the plurality of candidate cells to a common central control node in the communication system, the common central control node corresponding to each of the plurality of candidate cells.

As described above, all the cells have a shared common central control node is identified by a logical cell ID. Therefore, UE can determine a common central control node based on the logical cell ID of each cells, and select a set of cells which have the same logical cell ID (which share the same common central control node) as the plurality of candidate cells. The selected plurality of candidate cells could be all cells which have the same logical cell ID; or part of cells which have the same logical cell ID. When the plurality of candidate cells are part of cells which have the same logical cell ID, these candidate cells may be selected based on the measurement for neighbour cells, e.g. selecting all the suitable cells with highest RSRP/RSRQ.

When there is data to send, the UE sends the common connection setup request message to the common central control node. The common connection setup request message may comprise: "default" setting which means the common connection is going to applied to all the cells having the same logical cell ID, or a "preferred cell list" of the selected plurality of candidate cells which means the common connection is applied to the selected plurality of candidate cells.

Then, the common central control node 700 determines a plurality of connecting cells from the plurality of candidate cells, and transmits a common connection setup message for the plurality of connecting cells to the user equipment, so that the user equipment establishes multiple radio connections through each of the plurality of connecting cells.

The common central control node sends a common connection setup message after receiving the common connection setup request sent from UE. Upon receiving the common connection setup request message, the common central control node decides which connecting cells the connection could apply and includes it into the common connection setup message. The common central control node can make the filtering from the candidate cells requested by UE and inform UE about the final decision which cells could be used in the end. The decision of the plurality of connecting cells can consider the candidate cells and the cell status, e.g. load status.

According to an embodiment of the invention, UE can confirm the common connection with all the connecting cells by sending a common connection setup complete message to the common central control node.

According to an embodiment of the invention, UE receives a common connection configuration message transmitted by the common central control node, wherein the common connection configuration message is sent by the common central control node through any of the plurality of connecting cells, and UE sends a common connection configuration complete message to the common central control node, and in the meanwhile applies the common connection configuration to any one or more of the plurality of connecting cells.

The common central control node can send the common connection configuration messages in order to configure related parameters i.e. common configurations, to the UE. And UE applies the common configuration and confirms via a common connection configuration complete message. The transmission of common connection configuration messages e.g. RRC (e.g. RRC connection reconfiguration procedure), NAS (uplink or downlink PDU transmission procedure), could be via any of the possible connections between UE and the connecting cells, and can be applied to all the other of the connections. The selection for message transmitting can be determined based on the channel measurement, etc. Afterwards, the common central control node informs all the connecting cells to which UE can setup the multi-connection to apply the common configuration for the UE and be ready to serve the UE. Up to now, a common connection has been setup with multiple connecting cells and these connecting cells have the common configuration from the common central control node.

Furthermore, during the reconfiguration process, UE receives a common connection reconfiguration message transmitted by the common central control node, wherein the common connection reconfiguration message is sent by the common central control node through any of the plurality of connecting cells, and UE sends a common connection reconfiguration complete message to the common central control node, and in the meanwhile applies the common connection reconfiguration to any one or more of the plurality of connecting cells.

Optionally, UE may determine whether it does not complete configuration for some of the plurality of connecting cells; and when the UE does not complete the configuration for some of the plurality of connecting cells, it can remove the connecting cells that have not been completely configured from the plurality of connecting cells and indicate an updated connecting cell list in reconfiguration complete message.

According to an embodiment of the invention, UE can send a measurement report for any of the plurality of connecting cells through this connecting cell or any other connecting cells of the plurality of connecting cells, to the common central control node. It is possible to add new connecting cells or remove some connecting cells according to the measurement results. Given the common connection with multiple cells, the handover procedure is done by adding and/or removing a cell. As long as more than two cells are in the common connection, the UE has more than one link to the system therefore the reliability is improved and the handover interruption could be eliminated.

According to an embodiment of the invention, when the UE detects radio link failure in a connecting cell, e.g. by receiving the out-of-sync from lower layers for several times. The UE would send notification informing the radio link failure to the common central control node via other connecting cells. When receiving the notification, the common central control node sets this connecting cell to pending state and prohibits the cell from transmitting/receiving data for a certain time period e.g. a timer. The UE would inform the recovery of the link if the link is recovered before the timer expires, then the common central control node recover the state of this connecting cell and informs this connecting cell continuing serving the UE. Otherwise, if the UE does not receive any link recovery notification until timer expires, the common central control node assumes this link fails eventually and informs removing this connecting cell.

According to an embodiment of the invention, when the UE do not have one link to the common central control node, the common connection in this invention may handover to the legacy procedure. Radio link monitoring is on all the connections, and this handover procedure is not triggered as long as there is at least one connection available.

According to an embodiment of the invention, when the common central control node decides to release the common connection, the common central control node will send a connection release message via any of the current connecting cells and the UE then disconnects with all the connecting cells.

In summary, based on the communication system of the present invention, multiple connections can be set up at the cost of single connection setup procedure, which saves signalling overhead to the network. (i.e. multi-connection setup in radio interface will converge into one S1-MME interface management process), and the multi-connectivity could be started from the beginning of UE access, which save time compared with legacy schemes. Further, the message of the common central control node could be sent on any of the connections, which allows using the best connections hence improving the transmission reliability and efficiency.

Although the connection setup method, communication system, user equipment and common central control node are described in combination with the embodiments in 5G network, however, for those skilled in the art, the methods can be used in other communication systems without paying creative work, such as LTE, LTE-Advanced, Wideband Code-Division Multiple Access (WCDMA), Global System for Mobile communications/Enhanced Data rate for GSM Evolution (GSM/EDGE), or GSM network, or other network or system. Therefore, the methods, communication system, user equipment and access point are not limited to 5G network.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A connection setup method performed by a user equipment, said method comprising:
    acquiring information transmitted by a plurality of cells;
    determining a plurality of candidate cells according to the information transmitted by the plurality of cells;
    sending a common connection setup request for the plurality of candidate cells to a common central control node, the common central control node corresponding to each of the plurality of candidate cells; and
    receiving a common connection setup message for a plurality of connecting cells transmitted by the common central control node, the plurality of connecting cells being determined from the plurality of candidate cells by the common central control node, so that the user equipment establishes multiple radio connections through each of the plurality of connecting cells,
    wherein the acquiring information transmitted by the plurality of cells comprises acquiring a cell ID and a logical cell ID of each cell of the plurality of cells,
    the determining a plurality of candidate cells according to the information transmitted by a plurality of cells comprises determining all cells having the same logical cell ID as the plurality of candidate cells, or selecting a portion of the cells having the same logical cell ID as the plurality of candidate cells based on wireless channel measurement results for the plurality of cells,
    wherein the method further comprises sending a common connection configuration complete message to the common central control node, and
    wherein sending the common connection configuration complete message to the common central control node comprises determining whether the user equipment does not complete configuration for some of the plurality of connecting cells, and when the user equipment does not complete the configuration for some of the plurality of connecting cells, removing the connecting cells that have not been completely configured from the plurality of connecting cells and transmitting the updated plurality of connecting cells through the common connection configuration complete message.

2. The method according to claim 1, wherein the method further comprising:
    sending a common connection setup complete message to the common central control node.

3. The method according to claim 1, wherein the method further comprising:
    receiving a common connection configuration message transmitted by the common central control node, wherein the common connection configuration message is sent by the common central control node through any of the plurality of connecting cells;
    sending a common connection configuration complete message to the common central control node, and in the meanwhile applies the common connection configuration to any one
    or more of the plurality of connecting cells.

4. A connection setup method in a communication system, the method comprising:
    a user equipment in the communication system acquiring information transmitted by a plurality of cells in the communication system;
    the user equipment determining a plurality of candidate cells according to the information transmitted by the plurality of cells, and sending a common connection setup request for the plurality of candidate cells to a common central control node in the communication system, the common central control node corresponding to each of the plurality of candidate cells; and
    the common central control node determining a plurality of connecting cells from the plurality of candidate cells, and transmitting a common connection setup message for the plurality of connecting cells to the user equipment, so that the user equipment establishes multiple radio connections through each of the plurality of connecting cells,
    wherein the acquiring information transmitted by a plurality of cells comprises acquiring a cell ID and a logical cell ID of each cell of the plurality of cells,
    the determining a plurality of candidate cells according to the information transmitted by a plurality of cells comprises determining all cells having the same logical cell ID as the plurality of candidate cells, or selecting a portion of the cells having the same logical cell ID as the plurality of candidate cells based on wireless channel measurement results for the plurality of cells, wherein the method further comprises the user equipment sending a common connection configuration complete message to the common central control node, and wherein sending the common connection configuration complete message to the common central control node comprises the user equipment determining whether the user equipment does not complete configuration for some of the plurality of connecting cells, and when the user equipment does not complete the configuration for some of the plurality of connecting cells, removing the connecting cells that have not been completely configured from the plurality of connecting cells and transmitting the updated plurality of connecting cells through the common connection configuration complete message.

5. A user equipment, comprising:

a cell acquisition unit configured to acquire information transmitted by a plurality of cells;

a connection request sending unit configured to determine a plurality of candidate cells according to information transmitted by the plurality of cells and send a common connection setup request for the plurality of candidate cells to a common central control node, the common central control node corresponding to each of the plurality of candidate cells; and a connection message receiving unit configured to receive a common connection setup message for a plurality of connecting cells transmitted by the common central control node, the plurality of connecting cells being determined from the plurality of candidate cells by the common central control node, so that the user equipment establishes multiple radio connections through each of the plurality of connecting cells, wherein the acquiring information transmitted by a plurality of cells comprises the cell acquisition unit configured to acquire a cell ID and a logical cell ID of each cell of the plurality of cells, the determining a plurality of candidate cells according to the information transmitted by a plurality of cells comprises the connection request sending unit configured to determine all cells having the same logical cell ID as the plurality of candidate cells, or selecting a portion of the cells having the same logical cell ID as the plurality of candidate cells based on wireless channel measurement results for the plurality of cells, wherein the user equipment further comprises a configuration complete message sending unit configured to send a common connection configuration complete message to the common central control node, and wherein sending the common connection configuration complete message to the common central control node comprises determining whether the user equipment does not complete configuration for some of the plurality of connecting cells, and when the user equipment does not complete the configuration for some of the plurality of connecting cells, removing the connecting cells that have not been completely configured from the plurality of connecting cells and transmitting the updated plurality of connecting cells through the common connection configuration complete message.

6. The user equipment according to claim 5, further comprising:

a configuration message receiving unit configured to receive a common connection configuration message transmitted by the common central control node, wherein the common connection configuration message is sent by the common central control node through any of the plurality of connecting cells; and a configuration complete message sending unit configured to send a common connection configuration complete message to the common central control node, and in the meanwhile applies the common connection configuration to any one or more of the plurality of connecting cells.

7. A communication system, comprising:

a user equipment configured to acquire information transmitted by a plurality of cells in the communication system, and determine a plurality of candidate cells according to the information transmitted by the plurality of cells and send a common connection setup request for the plurality of candidate cells to a common central control node in the communication system, the common central control node corresponding to each of the plurality of candidate cells; and a common central control node configured to determine a plurality of connecting cells from the plurality of candidate cells, and transmit a common connection setup message for the plurality of connecting cells to the user equipment, so that the user equipment establishes multiple radio connections through each of the plurality of connecting cells, wherein the acquiring information transmitted by a plurality of cells comprises acquiring a cell ID and a logical cell ID of each cell of the plurality of cells, the determining a plurality of candidate cells according to the information transmitted by a plurality of cells comprises determining all cells having the same logical cell ID as the plurality of candidate cells, or selecting a portion of the cells having the same logical cell ID as the plurality of candidate cells based on wireless channel measurement results for the plurality of cells, wherein the user equipment is further configured to send a common connection configuration complete message to the common central control node, and wherein sending the common connection configuration complete message to the common central control node comprises determining whether the user equipment does not complete configuration for some of the plurality of connecting cells, and when the user equipment does not complete the configuration for some of the plurality of connecting cells, removing the connecting cells that have not been completely configured from the plurality of connecting cells and transmitting the updated plurality of connecting cells through the common connection configuration complete message.

* * * * *